(12) United States Patent
Chen (10) Patent No.: US 11,348,204 B2
(45) Date of Patent: May 31, 2022

(54) IMAGE ADAPTIVE NOISE REDUCTION METHOD AND DEVICE THEREOF

(71) Applicant: TCL CHINA STAR OPTOELECTRONICS TECHNOLOGY CO., LTD., Shenzhen (CN)

(72) Inventor: Yunna Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 214 days.

(21) Appl. No.: 16/646,054

(22) PCT Filed: Jan. 10, 2020

(86) PCT No.: PCT/CN2020/071307
§ 371 (c)(1),
(2) Date: Mar. 10, 2020

(87) PCT Pub. No.: WO2021/128498
PCT Pub. Date: Jul. 1, 2021

(65) Prior Publication Data
US 2022/0051368 A1  Feb. 17, 2022

(30) Foreign Application Priority Data
Dec. 25, 2019 (CN) .......................... 201911352759.5

(51) Int. Cl.
*G06T 5/00* (2006.01)
*G06T 5/20* (2006.01)
*G06T 5/50* (2006.01)

(52) U.S. Cl.
CPC ................ *G06T 5/002* (2013.01); *G06T 5/20* (2013.01); *G06T 5/50* (2013.01);
(Continued)

(58) Field of Classification Search
CPC .. G06T 5/002; G06T 5/20; G06T 5/50; G06T 2207/10024; G06T 2207/20021;
(Continued)

(56) References Cited

U.S. PATENT DOCUMENTS 8,457,433 B2 * 6/2013 Hong .................... G06T 3/4015
382/260
2010/0111414 A1 * 5/2010 Aragaki .................. G06T 5/008
382/167

(Continued)

*Primary Examiner* — Jose L Couso
(74) *Attorney, Agent, or Firm* — Osha Bergman Watanabe & Burton LLP (57) ABSTRACT

The present invention discloses an image adaptive noise reduction method and a device thereof. The method includes: dividing an original image into a plurality of sub-blocks; performing a space conversion for all the sub-blocks; performing a significance analysis to obtain a significant characteristic map; performing a threshold segmentation on all the significant characteristic maps by a significant standard value to obtain a significant characteristic region and a non-significant characteristic region; performing adaptive filtering on the significant characteristic region and maxing an original image in the non-significant characteristic region to obtain a mixed image; and performing an image space inverse conversion for the mixed image, and outputting a final image. The present invention uses the method of dividing the image, based on the significant characteristics of the image, reducing noise reduction in the non-significant characteristic region, saving algorithm running time and hardware resources.

17 Claims, 3 Drawing Sheets

(52) U.S. Cl.
CPC ............... *G06T 2207/10024* (2013.01); *G06T 2207/20021* (2013.01); *G06T 2207/20028* (2013.01); *G06T 2207/20076* (2013.01); *G06T 2207/20221* (2013.01)

(58) Field of Classification Search
CPC . G06T 2207/20028; G06T 2207/20076; G06T 2207/20221; G06T 2207/20192; G06T 2207/20012; G06T 2207/20016; G06T 2207/20032; G06T 2207/20104; G06T 2207/10004; G06T 2207/10016; G06T 5/10; G06T 5/003; G06T 5/008; G06T 5/009; G06T 7/90; G06T 3/4015; G06T 11/001; G06T 2207/20004; G06K 9/40; G06K 9/4652; G06K 9/6289; G06K 15/1878; G06K 9/3233; H04N 5/202; H04N 5/208; H04N 9/73; H04N 9/646; H04N 9/68; H04N 1/4092; H04N 9/04515; H04N 5/357; H04N 1/409; H04N 1/46; H04N 1/52; H04N 1/56; H04N 1/58; H04N 1/60–648; G09G 2300/0452; G09G 2340/06; G09G 3/2003; G06V 10/25; G06V 10/30; G06V 10/803

See application file for complete search history.

(56) References Cited

U.S. PATENT DOCUMENTS

| | | | |
|---|---|---|---|
| 2017/0061234 A1* | 3/2017 | Lim | ................... G06T 5/002 |
| 2017/0061582 A1* | 3/2017 | Lim | ................... G06T 5/002 |
| 2017/0070718 A1* | 3/2017 | Baqai | .................. H04N 5/217 |
| 2017/0318240 A1* | 11/2017 | Yu | ..................... H04N 5/357 |

\* cited by examiner

IMAGE ADAPTIVE NOISE REDUCTION METHOD AND DEVICE THEREOF

FIELD OF INVENTION

The present invention relates to the field of image processing technology, and in particular, to an image adaptive noise reduction method and a device thereof.

BACKGROUND OF INVENTION

The block-based Discrete Cosine Transform (BDCT) coding is widely used in the compression field, including image and video compression standards, such as JPEG, H.264, etc. However, because BDCT ignores correlations between neighboring blocks, discontinuities may occur at block boundaries.

Technical Problem

Blocking and mosquito noise caused by traditional decompression use global noise reduction methods, such as bilateral filtering noise reduction methods with uniform parameters for an entire image. If the bilateral filtering noise reduction methods with uniform parameters are used for the image, regions with more details will still be blurred, and reducing image qualities. Moreover, due to limited hardware resources, complex algorithms will cause longer processing time and cannot be processed in real time.

TECHNICAL SOLUTION

In view of shortcomings of the above problems, an objective of the present invention is to provide a new technical solution to solve one of the above problems. The present invention provides a method based on the human eye significance analysis, which can reduce consumption of hardware resources to a certain extent when the human eye is difficult to detect, and obtains a detailed map through local entropy, which can retain details as much as possible while denoising.

In order to achieve the above objective, the present invention provides an image adaptive noise reduction method, comprising following steps of: (1) dividing an original RGB image with noise into a plurality of sub-blocks; (2) performing an image space conversion from an RGB space to a YCbCr space for all the sub-blocks; (3) performing a significance analysis on each of the sub-blocks to obtain a significant characteristic map after the image space conversion; (4) determining whether a weight threshold of the significant characteristic map of a currently processed one of the sub-blocks is greater than a significant standard value, wherein if the weight threshold is greater than the significant standard value, the currently processed one of the sub-blocks is classified into a significant characteristic region, otherwise currently processed one of the sub-blocks is classified into a non-significant characteristic region, wherein significant values of the sub-blocks are generated and recorded, and all the significant characteristic maps are examined to obtain the significant characteristic region and the non-significant characteristic region; (5) obtaining a detailed map through a local entropy calculation for each sub-block in the significant characteristic region; performing bilateral filtering on Y channels of all the sub-blocks in the significant characteristic region, and using the detail map to adaptively adjust bilateral filtering results to output first noise reduction images; adjusting channel values of the Y channels of all the sub-blocks in the significant characteristic region through the detail map to output second noise reduction images; mixing the first noise reduction image and the second noise reduction image to obtain a first image, each sub-block in the non-significant characteristic region outputs a second image with original pixel values, and mixing all the first images with the second images to obtain a mixed image; and (6) performing an image space inverse conversion from the YCbCr space to the RGB space for the mixed image and outputting a final image.

In order to achieve the above objective, the present invention further provides an image adaptive noise reduction method, comprising following steps of: (1) dividing an original RGB image with noise into a plurality of sub-blocks; (2) performing an image space conversion from an RGB space to a YCbCr space for all the sub-blocks; (3) performing a significance analysis on each of the sub-blocks to obtain a significant characteristic map after the image space conversion; (4) performing a threshold segmentation on all the significant characteristic maps by a significant standard value to obtain a significant characteristic region and a non-significant characteristic region; (5) performing adaptive noise reduction on pixel values of the sub-blocks in the significant characteristic region to output first images, and each the sub-block in the non-significant characteristic region outputs a second image with an original pixel value, and mixing all the first images with the second images to obtain a mixed image; and (6) performing an image space inverse conversion from the YCbCr space to the RGB space for the mixed image and outputting a final image.

In order to achieve the above objective, the present invention further provides an image adaptive noise reduction device, comprising: an image division module for dividing an original RGB image with noise into a plurality of sub-blocks; an image space conversion module for performing an image space conversion from an RGB space to a YCbCr space on all the sub-blocks; a significance analysis module for performing a significance analysis on each of the sub-blocks to obtain a significant characteristic map after the image space conversion; a significant segmentation module for performing a threshold segmentation on all the significant characteristic maps by a significant standard value to obtain a significant characteristic region and a non-significant characteristic region; an image output module for performing adaptive noise reduction on pixel values of the sub-blocks in the significant characteristic region to output first images, controlling each the sub-block in the non-significant characteristic region to output a second image with an original pixel value, and mixing the first image and the second image to obtain a mixed image; and an image space inverse conversion module for inversely converting the mixed image from the YCbCr space to the RGB space and outputting a final image.

BENEFICIAL EFFECT

The beneficial effect of the present invention is: using a method of dividing images, based on significant characteristics of the images, adaptively denoising a significant region and reducing a noise reduction of non-significant region. Without reducing perceived quality of people, while improving the image display quality, it saves algorithm running time and hardware resources. Calculating image detail map through local entropy, adaptively adjusting weight of bilateral filtering according to an amount of detail, retaining the details, and solving a phenomenon of blurring in the detail region caused by a filtering method to achieve a sufficient noise reduction effect. The significance analysis method of image segmentation can be applied to other noise reduction algorithms and has universality.

DESCRIPTION OF DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DETAILED DESCRIPTION OF PREFERRED EMBODIMENTS

The specific structural and functional details disclosed herein are merely representative and are used for the purpose of describing the exemplary embodiments of the present invention. However, this application may be embodied in many alternative forms and should not be construed as being limited only to the embodiments set forth herein.

In the description of the present invention, it is to be understood that the terms "center," "longitudinal," "lateral," "length," "width," "thickness," "upper," "lower," "front," "rear," "left," "right," "vertical," "horizontal," "top," "bottom," "inner," "outer," "clockwise," "counterclockwise," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise. In addition, the term "including" and any variations thereof are intended to cover a non-exclusive inclusion.

In the description of the present invention, it is to be noted that, unless otherwise explicitly specified or limited, the terms "mounted," "connected," and "linked" are to be construed broadly, e.g., as meaning either a fixed connection, a removable connection, or an integral connection; may be mechanically connected, may be electrically connected or may be in communication with each other; either directly or indirectly through intervening media, either internally or in any other relationship. The specific meaning of the above terms in the present invention can be understood by those of ordinary skill in the art as appropriate.

The terminology used herein is for the purpose of describing particular embodiments only and is not intended to limit the exemplary embodiments. Unless the context clearly indicates otherwise, as used herein, the singular forms "a" and "an" are intended to include the plural. It should also be understood that the terms "including" and/or "comprising" as used herein specify the presence of stated features, integers, steps, operations, units and/or components without precluding the presence or addition of one or more Other features, integers, steps, operations, units, components, and/ or combinations thereof.

The present invention is further described below with reference to the drawings and embodiments.

Figure 1:
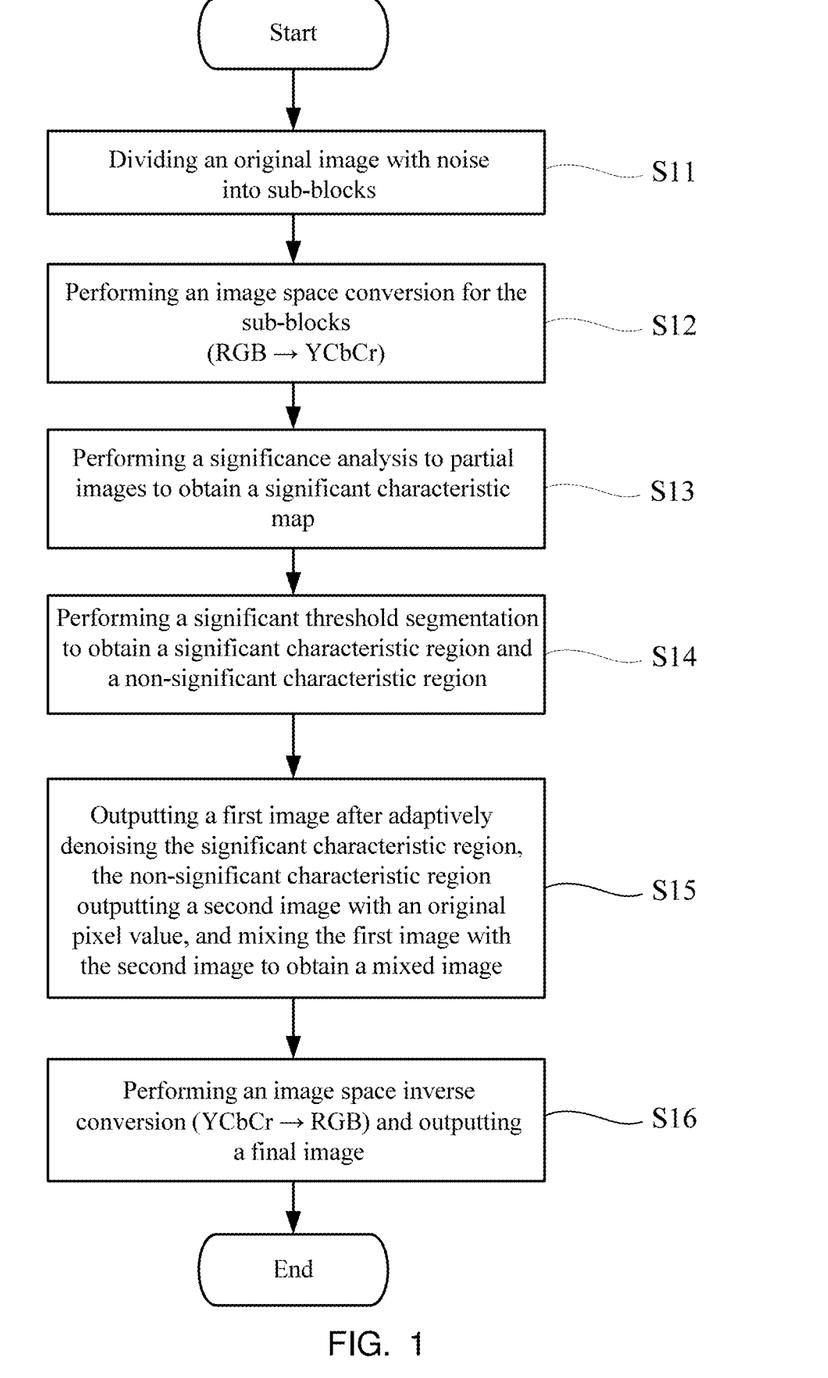
FIG. 1 is a flowchart of an image adaptive noise reduction method of the present invention.
Figure 2:
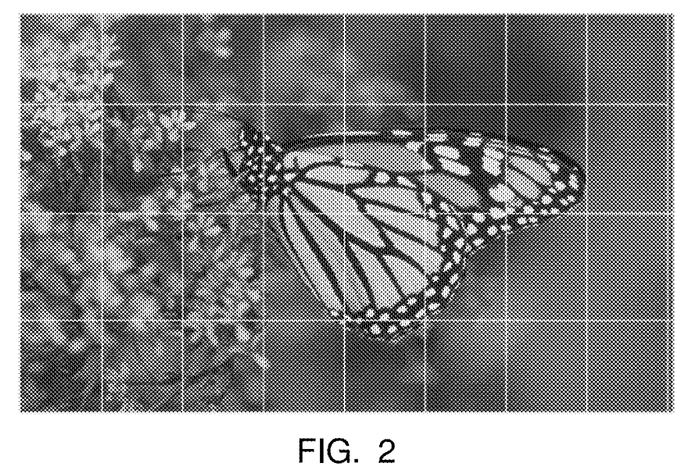
FIG. 2 is a processing result of an original image after blocking.
Figure 3:
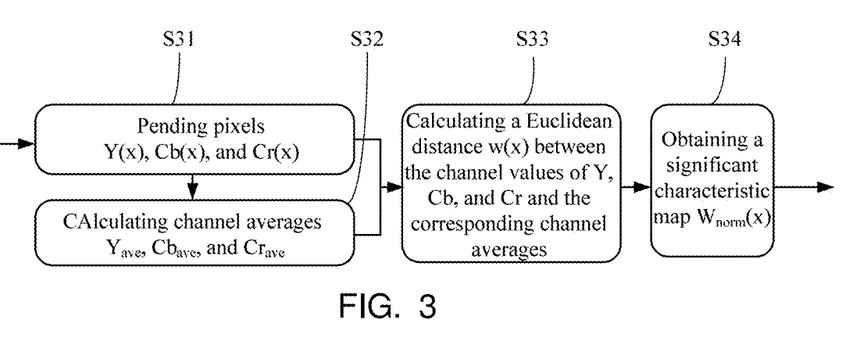
FIG. 3 is a flowchart of sub-steps according to an embodiment of significance analysis of the present invention.
Figure 4:
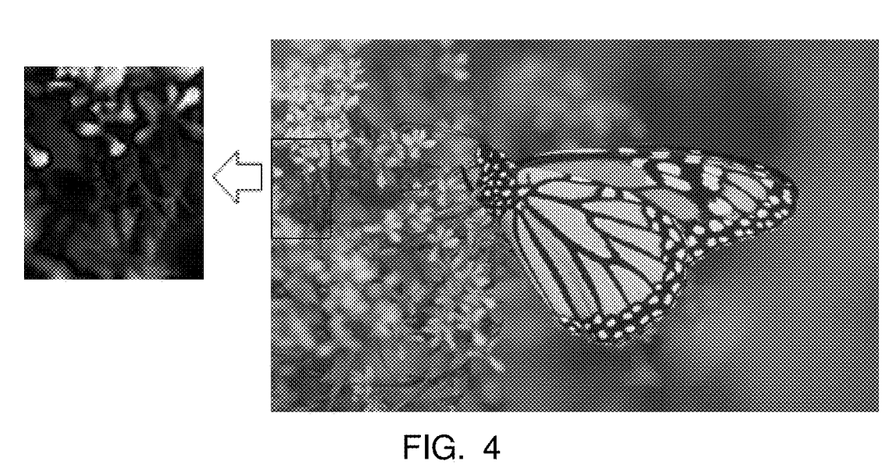
FIG. 4 is a significant characteristic diagram obtained after processing a sub-block of the present invention.
Figure 5:
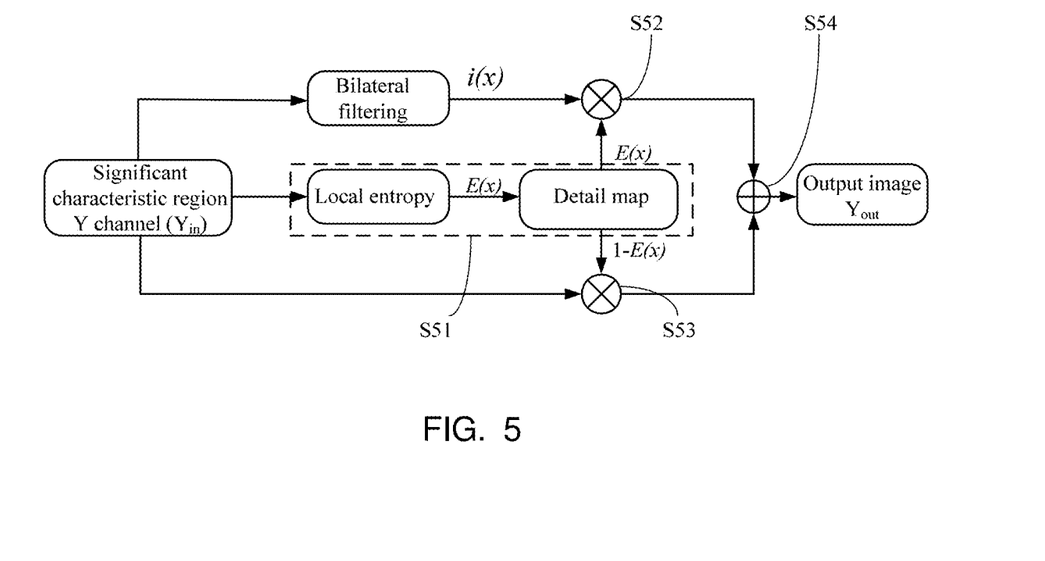
FIG. 5 is a schematic diagram of an algorithm for processing a significant characteristic region according to an embodiment of the present invention.

Please refer to FIG. 1 to FIG. 5 together. FIG. 1 is a flowchart of an image adaptive noise reduction method of the present invention. FIG. 2 is a processing result of an original image after blocking. FIG. 3 is a flowchart of sub-steps according to an embodiment of significance analysis of the present invention. FIG. 4 is a significant characteristic diagram obtained after processing a sub-block of the present invention. FIG. 5 is a schematic diagram of an algorithm for processing a significant characteristic region according to an embodiment of the present invention.

As shown in FIG. 1, the present invention provides an image adaptive noise reduction method. Specific steps of the method comprise: S11: dividing an original RGB image with noise into a plurality of sub-blocks. S12: performing an image space conversion from an RGB space to a YCbCr space for all the sub-blocks. S13: performing a significance analysis on each of the sub-blocks to obtain a significant characteristic map after the image space conversion. S14: determining whether a weight threshold of the significant characteristic map of a currently processed one of the sub-blocks is greater than a significant standard value, wherein if the weight threshold is greater than the significant standard value, the currently processed one of the sub-blocks is classified into a significant characteristic region, otherwise currently processed one of the sub-blocks is classified into a non-significant characteristic region, wherein significant values of the sub-blocks are generated and recorded, and all the significant characteristic maps are examined to obtain the significant characteristic region and the non-significant characteristic region. S15: obtaining a detailed map through a local entropy calculation for each sub-block in the significant characteristic region; performing bilateral filtering on Y channels of all the sub-blocks in the significant characteristic region, and using the detail map to adaptively adjust bilateral filtering results to output first noise reduction images; adjusting channel values of the Y channels of all the sub-blocks in the significant characteristic region through the detail map to output second noise reduction images; mixing the first noise reduction image and the second noise reduction image to obtain a first image, each sub-block in the non-significant characteristic region outputs a second image with original pixel values, and mixing all the first images with the second images to obtain a mixed image. And S16: performing an image space inverse conversion from the YCbCr space to the RGB space for the mixed image and outputting a final image. A detailed explanation is given below.

Regarding the step S11: dividing the original RGB image with noise into the plurality of sub-blocks.

Specifically, the image is divided into blocks according to a certain size. Dividing the original RGB image with noise into multiple disjoint sub-blocks of the same size, as shown in FIG. 2. The size of the sub-blocks can be set according to an actual image size and hardware resources. For example, for a 768×512 resolution image, it can be divided into 36 sub-blocks of 96×128 size for post-processing, but it is not limited to the embodiment.

Regarding the step S12: performing the image space conversion from the RGB space to the YCbCr space for all the sub-blocks.

Specifically, adopted conversion parameters can be set as:

$$\begin{bmatrix} Y \\ Cb \\ Cr \end{bmatrix} = \begin{bmatrix} 0 \\ 128 \\ 128 \end{bmatrix} + \begin{bmatrix} 0.299 & 0.587 & 0.114 \\ -0.1687 & 0.3313 & 0.500 \\ 0.500 & -0.4187 & -0.0813 \end{bmatrix} \cdot \begin{bmatrix} R \\ G \\ B \end{bmatrix}$$

Regarding the step S13: performing the significance analysis on each of the sub-blocks to obtain the significant characteristic map after the image space conversion.

Specifically, as shown in FIG. 3, the step S13 further comprises:

S31: obtaining channel values of three channels of Y, Cb, and Cr for each of the sub-blocks, and recording them as Y(x), Cb(x), and Cr(x), wherein x is a center coordinate of the sub-block;

S32: according to the channel values obtained in the step (31), calculating channel averages of the three channels Y, Cb, and Cr according to formula (1) to formula (3), and record them as $Y_{ave}$, $Cb_{ave}$, and $Cr_{ave}$, the formulas are:

$$Y_{ave} = \frac{\sum_{n=1}^{N} Y(x)}{N} \quad (1)$$

$$Cb_{ave} = \frac{\sum_{n=1}^{N} Cb(x)}{N} \quad (2)$$

$$Cr_{ave} = \frac{\sum_{n=1}^{N} Cr(x)}{N} \quad (3)$$

wherein N is a total number of the sub-blocks;

S33: calculating a Euclidean distance between the channel values of Y, Cb, and Cr, and the corresponding channel averages by a formula (4), and recorded as a significant weight w:

$$w(x) = \|(Y(x), Cb(x), Cr(x)) - (Y_{ave}, Cb_{ave}, Cr_{ave})\|_2 \quad (4)$$

S34: normalizing each the significant weight by a formula (5) to obtain a corresponding weight normalization value, and then obtain the significant characteristic map:

$$w_{Norm}(x) = \frac{w(x)}{w_{Max}} \quad (5)$$

wherein $w_{Max}$ is a maximum of all the significant weights, and x is the center coordinate of the sub-block.

As shown in FIG. 4, the current sub-block is processed into a significant feature map. It can be seen from the significant feature map of the image that the significant feature map has extracted regions of human interest. Due to hardware resource constraints, noise reduction processing can be performed on strong regions of concern, and the hardware resources can be saved by reducing noise reduction in weak regions of interest.

Regarding the step S14: performing the significant threshold segmentation on all the significant characteristic maps by the significant standard value to obtain the significant characteristic region and the non-significant characteristic region.

Specifically, significant threshold segmentation is performed on all the significant characteristic maps by a significant standard value α. The significant threshold segmentation is to judge whether the weight threshold of the significant characteristic map of the current operating sub-block is greater than the significant standard value, thereby generating and recording the significant value of the sub-block. All the significant characteristic maps are examined to obtain the significant characteristic region and the non-significant characteristic region. If the weight threshold of the significant map of the current operator sub-block is greater than the significant standard value α, it is classified into the significant characteristic region, and the significant value R(x) is recorded as 1. Otherwise, it is classified into the non-significant characteristic region, and the significant value R(x) is recorded as 0. As shown in the following formula:

$$R(x) = \begin{cases} 1 & \text{if } wNorm(x) > \alpha \\ 0 & \text{if } wNorm(x) \leq \alpha \end{cases}$$

Wherein, α∈[0,1], the value of a is related to specific hardware resources. In the embodiment, α=0.6.

Regarding the step S15: outputting the first image after adaptively denoising pixel values of each sub-block in the significant characteristic region, each sub-block in the non-significant characteristic region outputting the second image with original pixel values, and mixing all the first images with the second images to obtain the mixed image.

Specifically, as shown in FIG. 5, the step S15 further comprises: S51: obtaining the detailed map through the local entropy calculation for each sub-block in the significant characteristic region; S52: performing bilateral filtering on Y channels of all the sub-blocks in the significant characteristic region, and using the detail map to adaptively adjust bilateral filtering results to output first noise reduction images; S53: adjusting the channel values of the Y channels of all the sub-blocks in the significant characteristic region through the detail map to output the second noise reduction images; and S54: mixing the first noise reduction image and the second noise reduction image to obtain the first image.

Further, in the step S51, the local entropy is calculated by a formula (6):

$$E(x) = -\sum_{i=0}^{255} P_i \log P_i \quad (6)$$

A value of the local entropy can indicate the amount of detail, the higher the value, the more texture or detail in the region. Wherein, $$P_i = \frac{Hist[i]}{\sum_{j=\Omega_i} Hist[j]},$$

x is the center coordinate of the sub-block; Pi is a probability of the number of gray levels of a current pixel in the total number of local pixels in a local window Ω; i is a gray value of the current pixel; j is the other gray value; Hist[i] is a histogram of the gray value of i. that is, the number of i gray levels in the local window Ω. A size of the local window Ω can be set to 5×5 or 7×7.

Further, in the step (52), the bilateral filtering is calculated by a formula (7):

$$\tilde{I}(x) = \frac{1}{C} \sum_{y \in N(x)} e^{\frac{-\|y-x\|^2}{2\sigma_d^2}} e^{\frac{-\|I(y)-I(x)\|^2}{2\sigma_r^2}} I(y) \quad (7)$$

Wherein, $$C = \sum_{y \in N(x)} e^{\frac{-\|y-x\|^2}{2\sigma_d^2}} e^{\frac{-\|I(y)-I(x)\|^2}{2\sigma_r^2}},$$

x is the center coordinate of the sub-block; y is the other coefficient coordinates of a template window; I(x) and I(y) represent pixel values corresponding to the coordinates; N(x) is a neighborhood of pixel (x); C is a normalization constant; $\sigma_d$ is a standard deviation of a geometric distance, and $\sigma_r$ is a standard deviation of a gray distance, which respectively control the attenuation rate of two geometric distances and gray distances. In the bilateral filtering, the pixel difference is small in the flat region, and the corresponding range weight is close to 1. Airspace weights play a major role, which is equivalent to directly Gaussian blurring in the region. In an edge region, the larger the pixel difference is, the lower the range coefficient is. As a result, the kernel function is reduced and the current pixel is less affected, thereby maintaining the edge details.

Further, in the step S15, a formula (8) is used to obtain the mixing image:

$$Y_{out}(x) = R(x) \times (E(x) \times \tilde{I}(x) + (1-E)) \times Y_{in}(x)) + (1-R(x)) \times Y_{in}(x) \quad (8)$$

Wherein x is the center coordinate of the sub-block, R(x) is a significant value of the corresponding sub-block, E(x) is the local entropy of the corresponding sub-block; $\tilde{I}(x)$ is an operation result of the bilateral filtering, and $Y_{in}(x)$ is a channel value of an input of the Y channel.

Obviously, the detail map of the output image obtained from local entropy adaptively adjusts bilateral filtering. For region with more details, in order to avoid loss of details, the output image mainly depends on the Y channel through the original image. For region with less detail, the output image mainly depends on the filtered image. For non-significant region, the output is the original pixel value.

Regarding the step S16: performing the image space inverse conversion from the YCbCr space to the RGB space for the mixed image and outputting the final image.

Specifically, the conversion parameters adopted are set to:

$$\begin{bmatrix} R \\ G \\ B \end{bmatrix} = \begin{bmatrix} 1.000 & 0.000 & 1.402 \\ 1.000 & -0.34414 & -0.7141 \\ 1.000 & 1.772 & 0.000 \end{bmatrix} \cdot \begin{bmatrix} Y \\ Cb-128 \\ Cr-128 \end{bmatrix}$$

The invention has the following advantages:

1. using the method of dividing image, based on the significant characteristics of the image, adaptively reduce noise in the significant region and reduce noise in the non-significant region. Without reducing perceived quality of people, while improving the image display quality, it saves algorithm running time and hardware resources.

2. Calculate the image detail map through the local entropy, adaptively adjust the weight of bilateral filtering according to the amount of detail, retain the details, and solve the phenomenon of blurring in the detail region caused by the filtering method to achieve a sufficient noise reduction effect.

3. Image block significance analysis method can be applied to other noise reduction algorithms and has universality.

Figure 6:
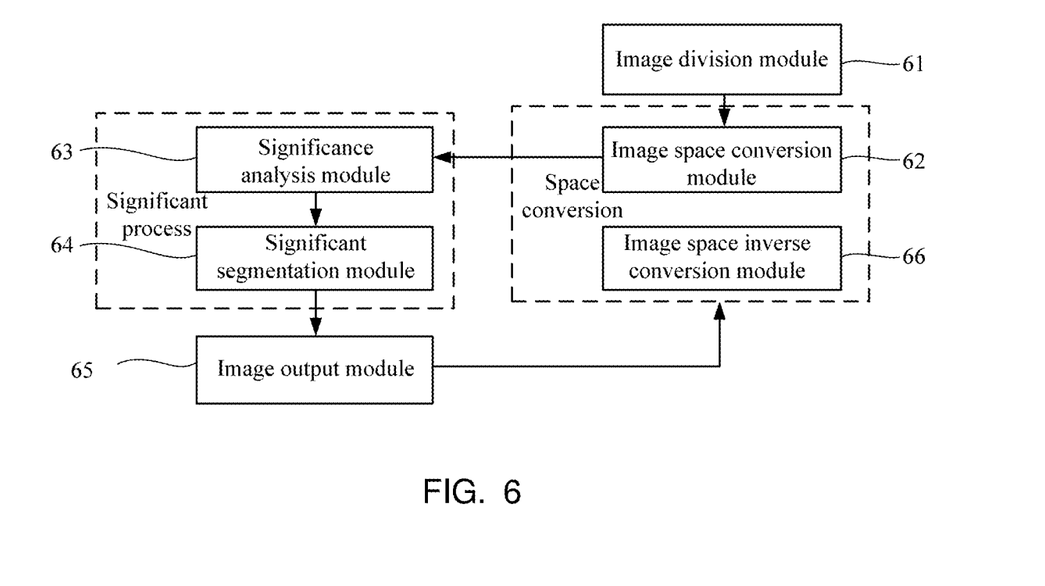
FIG. 6 is a structural block diagram of an image adaptive noise reduction device of the present invention.

Please refer to FIG. 6, which is a structural block diagram of an image adaptive noise reduction device of the present invention. As shown in FIG. 6, the invention further discloses an image adaptive noise reduction device, comprising: an image division module 61, an image space conversion module 62, a significance analysis module 63, a significant segmentation module 64, an image output module 65, and an image space inverse conversion module 66.

The image division module 61 is for dividing an original RGB image with noise into a plurality of sub-blocks. Specifically, the image division module 61 divides the image into blocks according to a certain size, and divides the original RGB image with noise into multiple disjoint sub-blocks of the same size. The size of the sub-block can be set according to the actual image size and hardware resources.

The image space conversion module 62 is for performing an image space conversion from an RGB space to a YCbCr space on all the sub-blocks.

Specifically, the image space conversion module 62 can perform matrix operations, and the conversion parameters used can be set to:

$$\begin{bmatrix} Y \\ Cb \\ Cr \end{bmatrix} = \begin{bmatrix} 0 \\ 128 \\ 128 \end{bmatrix} + \begin{bmatrix} 0.299 & 0.587 & 0.114 \\ -0.1687 & 0.3313 & 0.500 \\ 0.500 & -0.4187 & -0.0813 \end{bmatrix} \cdot \begin{bmatrix} R \\ G \\ B \end{bmatrix}$$

The significance analysis module 63 is for performing a significance analysis on each of the sub-blocks to obtain a significant characteristic map after the image space conversion.

Specifically, the significance analysis module 63 obtains channel values of the Y, Cb, and Cr channels of each of the sub-blocks, respectively. According to the obtained channel values, the channel averages of the three channels Y, Cb, and Cr are respectively calculated, and the Euclidean distances of the channel values of the Y, Cb, and Cr of each of the sub-blocks and the corresponding channel averages are respectively calculated as significant weight. Normalize each of the significant weights to obtain a corresponding weight normalization value, and then obtain the significant characteristic map.

The significant segmentation module 64 is for performing a threshold segmentation on all the significant characteristic maps by a significant standard value to obtain a significant characteristic region and a non-significant characteristic region.

Specifically, the significant segmentation module 64 determines whether the weight threshold of the significant characteristic map of the current operation sub-block is greater than the significant standard value. If the weight threshold is greater than the significant standard value, the currently processed one of the sub-blocks is classified into a significant characteristic region, otherwise the currently processed one of the sub-blocks is classified into a non-significant characteristic region, and significant values of the sub-blocks are generated and recorded. All the significant characteristic maps are traversed to obtain the significant characteristic region and the non-significant characteristic region.

The image output module 65 is for performing adaptive noise reduction on pixel values of the sub-blocks in the significant characteristic region to output first images, controlling each the sub-block in the non-significant characteristic region to output a second image with an original pixel value, and mixing the first image and the second image to obtain a mixed image.

Specifically, the image output module 65 is further configured to: obtaining a detailed map through a local entropy calculation for each sub-block in the significant characteristic region; performing bilateral filtering on Y channels of all the sub-blocks in the significant characteristic region, and using the detail map to adaptively adjust the bilateral filtering results to output first noise reduction images; adjusting channel values of the Y channels of all the sub-blocks in the significant characteristic region through the detail map to output second noise reduction images; and mixing the first noise reduction images with the second noise reduction images to obtain the first image.

The image space inverse conversion module 66 is for inversely converting the mixed image from the YCbCr space to the RGB space and outputting a final image.

Specifically, the image space inverse conversion module 66 may perform matrix operations, and the conversion parameters adopted are set to:

$$\begin{bmatrix} R \\ G \\ B \end{bmatrix} = \begin{bmatrix} 1.000 & 0.000 & 1.402 \\ 1.000 & -0.34414 & -0.7141 \\ 1.000 & 1.772 & 0.000 \end{bmatrix} \cdot \begin{bmatrix} Y \\ Cb - 128 \\ Cr - 128 \end{bmatrix}.$$

The image adaptive noise reduction method of the present invention can be applied to display terminals, and the display terminals may be smart phones, tablet computers, televisions, and other devices. Specifically, the display terminals comprise processors and memories that are electrically connected to each other. The processors are control centers of the display terminals. The processors use various interfaces and lines to connect various parts of the entire display terminals. The processors run or load applications stored in the memories, and call data stored in the memories to perform various functions of the display terminals and process data to monitor the display terminal as a whole.

In the present invention, the processors in the display terminals load the instructions corresponding to the process of one or more application programs into the memories according to the steps in the image adaptive noise reduction method of the present invention, and the processors run the application program stored in the memories, so as to realize various functions.

Those of ordinary skill in the art can understand that all or part of the steps in the various methods of the above embodiments can be completed by instructions, or control related hardware by instructions. The instructions may be stored in readable storage mediums of a computer and loaded and executed by processors. Therefore, an embodiment of the present invention provides a storage medium in which a plurality of instructions are stored, and the instructions can be loaded by the processors to execute the steps in any of the image adaptive noise reduction methods provided by the embodiments of the present invention.

The storage mediums may include: read-only memory (ROM), random access memory (RAM), magnetic disk or optical disk, etc.

In the above, various other corresponding changes and modifications can be made according to the technical solutions and technical ideas of the present invention to those skilled in the art, and all such changes and modifications are within the scope of the claims of the present invention.

What is claimed is:

1. An image adaptive noise reduction method, comprising following steps of:
    (1) dividing an original RGB image with noise into a plurality of sub-blocks;
    (2) performing an image space conversion from an RGB space to a YCbCr space for all the sub-blocks;
    (3) performing a significance analysis on each of the sub-blocks to obtain a significant characteristic map after the image space conversion;
    (4) determining whether a weight threshold of the significant characteristic map of a currently processed one of the sub-blocks is greater than a significant standard value, wherein if the weight threshold is greater than the significant standard value, the currently processed one of the sub-blocks is classified into a significant characteristic region, otherwise currently processed one of the sub-blocks is classified into a non-significant characteristic region, wherein significant values of the sub-blocks are generated and recorded, and all the significant characteristic maps are examined to obtain the significant characteristic region and the non-significant characteristic region;
    (5) obtaining a detailed map through a local entropy calculation for each sub-block in the significant characteristic region; performing bilateral filtering on Y channels of all the sub-blocks in the significant characteristic region, and using the detailed map to adaptively adjust bilateral filtering results to output first noise reduction images; adjusting channel values of the Y channels of all the sub-blocks in the significant characteristic region through the detailed map to output second noise reduction images; mixing the first noise reduction images and the second noise reduction images to obtain first images, each sub-block in the non-significant characteristic region outputs second images with original pixel values, and mixing all the first images with the second images to obtain a mixed image; and
    (6) performing an image space inverse conversion from the YCbCr space to the RGB space for the mixed image and outputting a final image.

2. The image adaptive noise reduction method as claimed in claim 1, wherein the step (3) further comprises:
    (31) obtaining channel values of three channels of Y, Cb, and Cr for each of the sub-blocks, and recording them as Y(x), Cb(x), and Cr(x), where x is a center coordinate of the sub-block;
    (32) according to the channel values obtained in the step (31), calculating channel averages of the three channels Y, Cb, and Cr according to formula (1) to formula (3), and record them as $Y_{ave}$, $Cb_{ave}$, and $Cr_{ave}$, the formulas are:

$$Y_{ave} = \frac{\sum_{n=1}^{N} Y(x)}{N} \qquad (1)$$

$$Cb_{ave} = \frac{\sum_{n=1}^{N} Cb(x)}{N} \qquad (2)$$

$$Cr_{ave} = \frac{\sum_{n=1}^{N} Cr(x)}{N} \qquad (3)$$

wherein N is a total number of the sub-blocks;

(33) calculating a Euclidean distance between the channel values of Y, Cb, and Cr and the corresponding channel averages by a formula (4), and recorded as a significant weight, w(x):

$$w(x)=\|(Y(x),Cb(x),Cr(x))-(Y_{ave},Cb_{ave},Cr_{ave})\|_2 \qquad (4)$$

(34) normalizing each of the significant weight by a formula (5) to obtain a corresponding weight normalization value, and then obtain the significant characteristic map:

$$w_{Norm}(x) = \frac{w(x)}{w_{Max}} \qquad (5)$$

wherein $w_{Max}$ is a maximum of all of the significant weight, and x is the center coordinate of the sub-block same as in step (31).

3. The image adaptive noise reduction method as claimed in claim 1, wherein in the step (51), the local entropy is calculated by a formula (6):

$$E(x) = -\Sigma_{i=0}^{255} P_i \log P_i \qquad (6)$$

wherein $$P_i = \frac{Hist[i]}{\sum_{j=\Omega_i} Hist[j]},$$

x is a center coordinate of the sub-block; i is a gray value of a pixel; j is a gray value of other pixel; Hist[i] is a histogram of the gray value represented by i; Pi is a probability of the number of all of the gray level of the pixel in the total number of the gray level of all of local pixels in a local window Ω i.

4. The image adaptive noise reduction method as claimed in claim 1, wherein in the step (52), the bilateral filtering is calculated by a formula (7):

$$\tilde{I}(x) = \frac{1}{C} \sum_{y \in N(x)} e^{\frac{-\|y-x\|^2}{2\sigma_d^2}} e^{\frac{-\|I(y)-I(x)\|^2}{2\sigma_r^2}} I(y) \qquad (7)$$

wherein, $$C = \sum_{y \in N(x)} e^{\frac{-\|y-x\|^2}{2\sigma_d^2}} e^{\frac{-\|I(y)-I(x)\|^2}{2\sigma_r^2}},$$

x is a center coordinate of the sub-block, y is a coefficient coordinate of a template window; I(x) and I(y) represent pixel values corresponding to the center coordinate and the coefficient coordinate respectively, N(x) is a neighborhood of pixel (x); C is a normalization constant, $\sigma_d$ is a standard deviation of a geometric distance, and $\sigma_r$ is a standard deviation of a gray distance.

5. The image adaptive noise reduction method as claimed in claim 1, wherein the step (5) calculates a filtered output result through a formula (8):

$$Y_{out}(x)=R(x)\times(E(x)\times\tilde{I}(x)+(1-E))\times Y_{in}(x))+(1-R(x))\times Y_{in}(x) \qquad (8)$$

wherein x is a center coordinate of the sub-block, R(x) is a significant value of the sub-block, E(x) is the local entropy of the corresponding sub-block; Ĩ(x) is an operation result of the bilateral filtering, and $Y_{in}(x)$ is a channel value of an input of the Y channel.

6. The image adaptive noise reduction method as claimed in claim 1, wherein the image space conversion in the step (1), conversion parameters adopted are set to:

$$\begin{bmatrix} Y \\ Cb \\ Cr \end{bmatrix} = \begin{bmatrix} 0 \\ 128 \\ 128 \end{bmatrix} + \begin{bmatrix} 0.299 & 0.587 & 0.114 \\ -0.1687 & -0.3313 & 0.500 \\ 0.500 & -0.4187 & -0.0813 \end{bmatrix} \cdot \begin{bmatrix} R \\ G \\ B \end{bmatrix}.$$

7. The image adaptive noise reduction method as claimed in claim 1, wherein the image space inverse conversion in the step (6), conversion parameters adopted are set to:

$$\begin{bmatrix} R \\ G \\ B \end{bmatrix} = \begin{bmatrix} 1.000 & 0.000 & 1.402 \\ 1.000 & -0.34414 & -0.7141 \\ 1.000 & 1.772 & 0.000 \end{bmatrix} \cdot \begin{bmatrix} Y \\ Cb-128 \\ Cr-128 \end{bmatrix}.$$

8. An image adaptive noise reduction method, comprising following steps of:
   (1) dividing an original RGB image with noise into a plurality of sub-blocks;
   (2) performing an image space conversion from an RGB space to a YCbCr space for all the sub-blocks;
   (3) performing a significance analysis on each of the sub-blocks to obtain a significant characteristic map after the image space conversion;
   (4) performing a threshold segmentation on all the significant characteristic maps by a significant standard value to obtain a significant characteristic region and a non-significant characteristic region;
   (5) performing adaptive noise reduction on pixel values of the sub-blocks in the significant characteristic region to output first images, and each of the sub-block in the non-significant characteristic region outputs second images and each with an original pixel value, and mixing the first images with the second images to obtain a mixed image; and
   (6) performing an image space inverse conversion from the YCbCr space to the RGB space for the mixed image, and outputting a final image.

9. The image adaptive noise reduction method as claimed in claim 8, wherein the step (3) further comprises:
   (31) obtaining channel values of three channels of Y, Cb, and Cr for each of the sub-blocks, and recording them as Y(x), Cb(x), and Cr(x), where x is a center coordinate of the sub-block;

(32) according to the channel values obtained in the step (31), calculating channel averages of the three channels Y, Cb, and Cr according to formula (1) to formula (3), and record them as $Y_{ave}$, $Cb_{ave}$, and $Cr_{ave}$, the formulas are:

$$Y_{ave} = \frac{\sum_{n=1}^{N} Y(x)}{N} \quad (1)$$

$$Cb_{ave} = \frac{\sum_{n=1}^{N} Cb(x)}{N} \quad (2)$$

$$Cr_{ave} = \frac{\sum_{n=1}^{N} Cr(x)}{N} \quad (3)$$

wherein N is a total number of the sub-blocks;

(33) calculating a Euclidean distance between the channel values of Y, Cb, and Cr and the corresponding channel averages by a formula (4), and recorded as a significant weight, w(x):

$$w(x) = \|(Y(x), Cb(x), Cr(x)) - (Y_{ave}, Cb_{ave}, Cr_{ave})\|_2 \quad (4)$$

(34) normalizing all of the significant weights by a formula (5) to obtain a corresponding weight normalization value, and then obtain the significant characteristic map:

$$w_{Norm}(x) = \frac{w(x)}{w_{Max}} \quad (5)$$

wherein $w_{Max}$ is a maximum of all of the significant weight, and x is a center coordinate of the sub-block.

10. The image adaptive noise reduction method as claimed in claim 8, wherein the step (4) further comprises:
 (41) determining whether a weight threshold of the significant characteristic map of a currently processed one of the sub-blocks is greater than a significant standard value, wherein if the weight threshold is greater than the significant standard value, the currently processed one of the sub-blocks is classified into a significant characteristic region, otherwise the currently processed one of the sub-blocks is classified into a non-significant characteristic region, and significant values of the sub-blocks are generated and recorded, and
 (42) all the significant characteristic maps are traversed to obtain the significant characteristic region and the non-significant characteristic region.

11. The image adaptive noise reduction method as claimed in claim 8, wherein the step (5) further comprise:
 (51) obtaining a detailed map through a local entropy calculation for each sub-block in the significant characteristic region;
 (52) performing bilateral filtering on Y channels of all the sub-blocks in the significant characteristic region, and using the detail map to adaptively adjust the bilateral filtering results to output first noise reduction images;
 (53) adjusting channel values of the Y channels of all the sub-blocks in the significant characteristic region through the detail map to output second noise reduction images; and
 (54) mixing the first noise reduction images and the second noise reduction images to obtain the first image.

12. The image adaptive noise reduction method as claimed in claim 11, wherein in the step (51), the local entropy is calculated by a formula (6):

$$E(x) = -\Sigma_{i=0}^{255} P_i \log P_i \quad (6)$$

wherein $$P_i = \frac{Hist[i]}{\sum_{j \in \Omega_i} Hist[j]},$$

x is a center coordinate of the sub-block; i is a gray value of a pixel; j is a gray value of other pixel; Hist[i] is a histogram of the gray value represented by i; Pi is a probability of the number of all of the gray level of the pixel in the total number of the gray level of all of local pixels in a local window $\Omega$.

13. The image adaptive noise reduction method as claimed in claim 11, wherein in the step (52), the bilateral filtering is calculated by a formula (7):

$$\tilde{I}(x) = \frac{1}{C} \sum_{y \in N(x)} e^{\frac{-\|y-x\|^2}{2\sigma_d^2}} e^{\frac{-\|I(y)-I(x)\|^2}{2\sigma_r^2}} I(y) \quad (7)$$

wherein $$C = \sum_{y \in N(x)} e^{\frac{-\|y-x\|^2}{2\sigma_d^2}} e^{\frac{-\|I(y)-I(x)\|^2}{2\sigma_r^2}},$$

x is a center coordinate of the sub-block, y is a coefficient coordinate of a template window; I(x) and I(y) represent pixel values corresponding to the center coordinate and the coefficient coordinate respectively, N(x) is a neighborhood of pixel (x); C is a normalization constant, $\sigma_d$ is a standard deviation of a geometric distance, and $\sigma_r$ is a standard deviation of a gray distance.

14. The image adaptive noise reduction method as claimed in claim 8, wherein the step (5) calculates a filtered output result through a formula (8):

$$Y_{out}(x) = R(x) \times (E(x) \times \tilde{I}(x) + (1-E)) \times Y_{in}(x)) + (1-R(x)) \times Y_{in}(x) \quad (8)$$

wherein x is a center coordinate of the sub-block, R(x) is a significant value of the sub-block, E(x) is the local entropy of the corresponding sub-block; $\tilde{I}(x)$ is an operation result of the bilateral filtering, and $Y_{in}(x)$ is a channel value of an input of the Y channel.

15. The image adaptive noise reduction method as claimed in claim 8, wherein the image space conversion in the step (1), conversion parameters adopted are set to:

$$\begin{bmatrix} Y \\ Cb \\ Cr \end{bmatrix} = \begin{bmatrix} 0 \\ 128 \\ 128 \end{bmatrix} + \begin{bmatrix} 0.299 & 0.587 & 0.114 \\ -0.1687 & -0.3313 & 0.500 \\ 0.500 & -0.4187 & -0.0813 \end{bmatrix} \cdot \begin{bmatrix} R \\ G \\ B \end{bmatrix}.$$

16. The image adaptive noise reduction method as claimed in claim 8, wherein the image space inverse conversion in the step (6), conversion parameters adopted are set to:

$$\begin{bmatrix} R \\ G \\ B \end{bmatrix} = \begin{bmatrix} 1.000 & 0.000 & 1.402 \\ 1.000 & -0.34414 & -0.7141 \\ 1.000 & 1.772 & 0.000 \end{bmatrix} \cdot \begin{bmatrix} Y \\ Cb - 128 \\ Cr - 128 \end{bmatrix}.$$

17. An image adaptive noise reduction device, comprising:

an image division module for dividing an original RGB image with noise into a plurality of sub-blocks;

an image space conversion module for performing an image space conversion from an RGB space to a YCbCr space on all the sub-blocks;

a significance analysis module for performing a significance analysis on each of the sub-blocks to obtain a significant characteristic map after the image space conversion;

a significant segmentation module for performing a threshold segmentation on all the significant characteristic maps by a significant standard value to obtain a significant characteristic region and a non-significant characteristic region;

an image output module for performing adaptive noise reduction on pixel values of the sub-blocks in the significant characteristic region to output first images, controlling each the sub-block in the non-significant characteristic region to output second images with an original pixel value, and mixing the first images and the second images to obtain a mixed image; and an image space inverse conversion module for inversely converting the mixed image from the YCbCr space to the RGB space, and outputting a final image.

* * * * *